United States Patent [19]
Ricciardi

[11] Patent Number: 5,405,049
[45] Date of Patent: Apr. 11, 1995

[54] ISOLATION PAD FOR A FEEDING SYSTEM AND A METHOD FOR FEEDING MATERIAL FROM THE SYSTEM

[75] Inventor: Ronald J. Ricciardi, Woodcliff Lake, N.J.

[73] Assignee: Acrison, Inc., Moonachie, N.J.

[21] Appl. No.: 143,487

[22] Filed: Oct. 27, 1993

[51] Int. Cl.⁶ .............................................. B65D 83/06
[52] U.S. Cl. ............................. 222/1; 222/196; 222/161; 267/141
[58] Field of Search ................. 222/161, 196, 1; 428/137; 188/378; 267/136, 141

[56] References Cited

U.S. PATENT DOCUMENTS

| | | |
|---|---|---|
| 2,101,561 | 12/1937 | Rapp . |
| 2,457,387 | 12/1948 | Locker .................. 222/196 X |
| 2,615,559 | 10/1952 | Hapman ................. 222/196 X |
| 2,792,030 | 5/1957 | Wahl . |
| 2,800,252 | 7/1957 | Wahl .......................... 222/196 |
| 2,858,011 | 10/1958 | Wahl . |
| 2,957,608 | 10/1960 | Wahl . |
| 3,012,697 | 12/1961 | Rouse et al. . |
| 3,078,015 | 2/1963 | Wahl . |
| 3,079,050 | 2/1963 | Wahl . |
| 3,151,782 | 10/1964 | Wahl . |
| 3,173,583 | 3/1965 | Wahl . |
| 3,186,602 | 6/1965 | Ricciardi .................. 222/161 |
| 3,203,599 | 8/1965 | Renner . |
| 3,248,018 | 4/1966 | Fleischman . |
| 3,257,040 | 6/1966 | Dumbaugh et al. . |
| 3,261,508 | 7/1966 | Wahl . |
| 3,278,090 | 10/1966 | Wahl . |
| 3,297,203 | 1/1967 | Wahl . |
| 3,297,304 | 1/1967 | Wahl . |
| 3,411,675 | 11/1968 | Wahl . |
| 3,552,545 | 1/1971 | Hartman . |
| 3,601,369 | 8/1971 | Wahl . |
| 3,773,231 | 11/1973 | Wahl . |
| 3,853,247 | 12/1974 | Wahl . |
| 4,131,193 | 12/1978 | Musschoot . |
| 4,546,872 | 10/1985 | Musschoot . |
| 4,804,111 | 2/1989 | Ricciardi . |
| 4,821,782 | 4/1989 | Hyer . |
| 4,867,343 | 9/1989 | Ricciardi et al. . |
| 4,972,970 | 11/1990 | Toerner . |

Primary Examiner—Kevin P. Shaver
Attorney, Agent, or Firm—Davis Hoxie Faithfull & Hapgood

[57] ABSTRACT

The present invention relates to an isolation pad for mounting a supply vessel to a feeding mechanism, and a system containing such a pad. The isolation pad is made of two plates connected by a flexible elastomer gasket. An aperture extends through both plates and the gasket. One plate is mounted to the supply vessel. The other plate is mounted to the feeding mechanism. Consequently, the supply vessel is supported by the elastomeric gasket. Because the gasket is flexible, the supply vessel is resilient and free to vibrate independently with respect to the feeding mechanism.

29 Claims, 2 Drawing Sheets

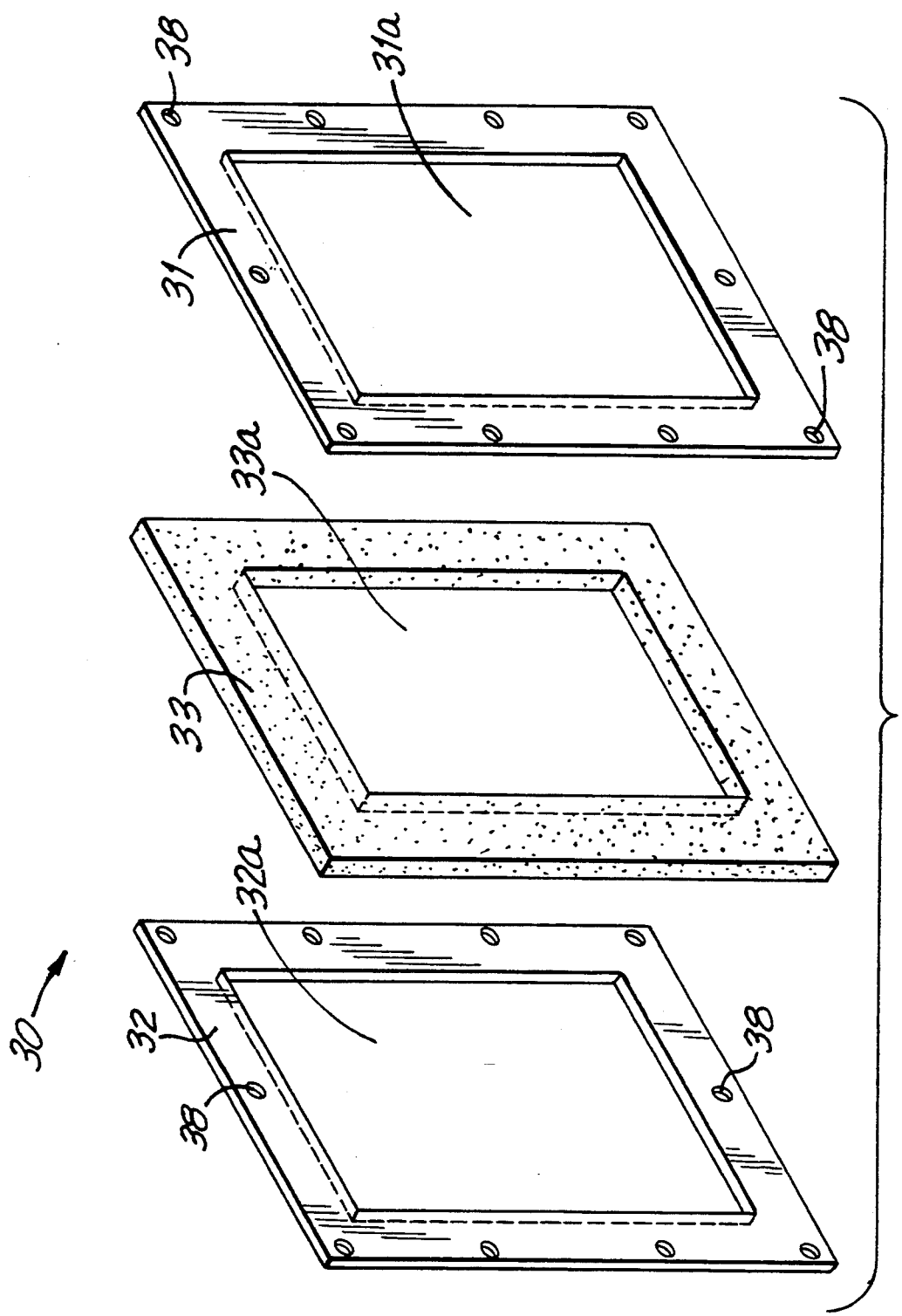

ISOLATION PAD FOR A FEEDING SYSTEM AND A METHOD FOR FEEDING MATERIAL FROM THE SYSTEM

FIELD OF THE INVENTION

The present invention relates to the field of dry bulk solids feeding systems, particularly, dry solids feeders.

BACKGROUND OF THE INVENTION

The precise metering of dry solids such as amorphous powders is an important, and often a difficult task in many applications. Whenever such materials are continuously fed into a process, the feed rate at which the material is delivered to the process must be controlled to ensure accuracy.

One type of dry solids feeding system is a volumetric feeder. As the name implies, volumetric feeders dispense material by volume. They employ a displacement measuring mechanism of some sort (for example, an auger mounted below a supply vessel and feeding a fixed volume of material per auger rotation) operating at a set speed. This results in feeding a known volume of material. The weight of material fed can generally be determined based on the material's bulk density. Other dry solids feeding systems are designed to weigh the product, where the weight measurement can be used to control the material feed rate. Such so-called "gravimetric" systems include loss-in-weight, weigh belt and weigh auger feeding systems.

Some materials, however, have a tendency to clump together or stick to the side of the supply vessel. Further, certain materials have a tendency to resist flow out of its supply vessel (hopper) and "rat hole" or bridge. This will cause the material to be fed at a nonuniform rate, or totally stop feeding, adversely affecting the process. To overcome these problems, the supply vessel can be vibrated. This vibration causes the material to flow more uniformly out of the supply vessel (or hopper).

There are various well-known arrangements of dry solids feeders in which its supply vessel (or hopper) is vibrated to cause product to flow out from within. The most common of these arrangements, where the supply vessel is rigidly attached to the feeding mechanism, is to simply attach a vibrator directly onto one of the sides of the supply vessel to induce product flow out from within.

However, there are several drawbacks to this configuration. Firstly, vibratory forces become non-uniform in nature because the supply vessel cannot vibrate as a separate entity. Since the supply vessel is rigidly attached to, or an integral part of, the feeding mechanism, vibration is transmitted to the feeding mechanism as well. In effect, the entire feeding system vibrates (that is, both the supply vessel and the feeding mechanism). However, vibration is primarily concentrated in that area of the supply vessel where the vibrator is physically mounted, which does not allow uniform vibratory forces to reach the product within because the supply vessel itself does not vibrate uniformly. Consequently, the effectiveness of the vibrator to promote flow is reduced. Secondly, such designs do not lend themselves to longevity because the specific wall of the supply vessel, where the vibrator device is physically attached, frequently fatigues due to non-uniform forces produced by the vibrator on the rigidly attached supply vessel.

In another known configuration, the supply vessel (or hopper) straddles the feeding mechanism and is independently mounted on vibration isolators, with the isolators affixed to a separate structure. Such designs typically involve placing the supply vessel on three or four vibration isolators (usually rubber or spring type mountings), so that the vessel becomes completely resilient (i.e., it can vibrate freely).

In such arrangements, the supply vessel is usually conical in shape, but always includes a converging bottom with its outlet flexibly connected to a mating inlet on the feeding mechanism (feeder). To promote flow, a vibrator is attached to the side of the supply vessel which, when energized, causes the vessel to vibrate uniformly as a separate entity. Vibration is confined strictly to the vessel and not transmitted to the feeding mechanism.

Although such designs are usually very effective in promoting flow of dry solids from within a supply vessel, they are also quite costly to manufacture. In addition, such systems consume considerable space due to the additional structural framework that is necessary to support the independent assembly. Usually, the dimensional requirements of such a structure are much larger than the footprint of the actual feeding device to which it attaches.

Consequently, it is an object of the present invention to provide an apparatus which permits the resilient mounting of a supply vessel to the feeding mechanism such that the vessel can be vibrated to promote flow of product from within, the vessel will vibrate uniformly, and vibration of the supply vessel will not transmit to the feeding mechanism (i.e., a "live" independent hopper).

It is another object of the present invention to provide a feeding mechanism in which its supply vessel is isolated from the feeding mechanism without any additional structural requirement.

It is still another object of the present invention to provide a method for isolating the vibration of the supply vessel while directing the flow of material from the supply vessel to the feeding mechanism.

It is still another object of the present invention to provide a feeding mechanism in which material is fed from its supply vessel to the feeding mechanism without the escape of material.

It is a further object of the present invention to provide a method for mounting a supply vessel to a feeding mechanism such that the vibration of the supply vessel does not transmit to the feeding mechanism.

These and other objects of the present invention will become clear to one skilled in the art from the following description of the invention.

SUMMARY OF THE INVENTION

One aspect of the present invention is an isolation pad having a lower plate and an upper plate connected by a flexible isolation gasket. The lower plate is rigidly mounted to the gasket by a lower attaching means. The upper plate is rigidly mounted to the gasket by an upper attaching means. The flexible isolation gasket is disposed between the upper plate and the lower plate such that a supply vessel for a dry solids feeding system is supported by the isolation gasket. The gasket not only permits the supply vessel to vibrate uniformly without transmitting the vibration to the feeding mechanism, but also, directs the flow of material from the supply vessel to the feeding mechanism without permitting the escape of material. The isolation pad can be used with volumetric feeders, gravimetric feeders and other feeding systems.

In accord with another aspect of the present invention, a method is provided for feeding dry bulk materials. A supply vessel (or hopper) is mounted to a feeding mechanism by a flexible gasket, such that the supply vessel is free to vibrate with respect to the feeding mechanism and the flow of material is directed by the gasket from the supply vessel to the feeding mechanism. This method can be employed with volumetric feeding systems, gravimetric feeding systems and other feeding systems.

BRIEF DESCRIPTION OF THE DRAWINGS

FIG. 3 is an exploded view of the isolation pad shown in FIG. 2.

DETAILED DESCRIPTION OF THE DRAWINGS

Figure 1:
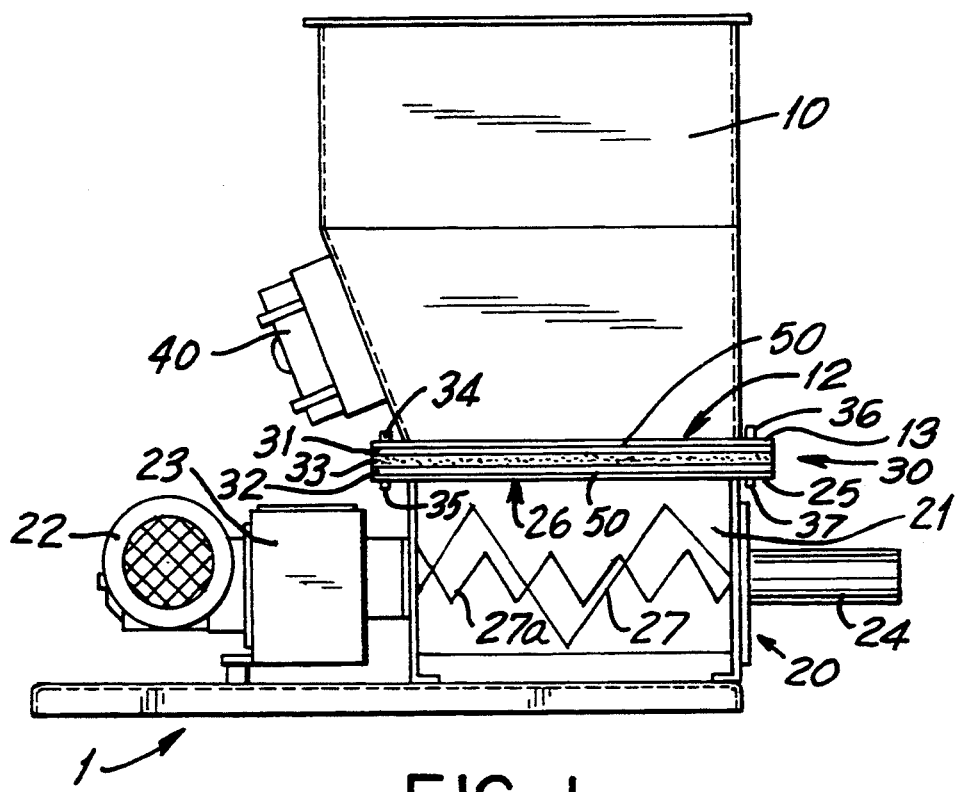
FIG. 1 is a side elevational view of a dry bulk solids feeding system (feeder) of the present invention including an isolation pad.

FIG. 1 is a side elevational view of a feeding system 1 of the present invention. The feeding system depicted is not limited to gravimetric or volumetric or other feeding system since the invention can be practiced with different types of feeding systems. A supply vessel 10 having an input 11 and outlet 12 is mounted to a feeding mechanism 20 by an isolation pad 30. A vibrator 40 is mounted to the supply vessel 10. The feeding mechanism 20 comprises a feed trough 21 and a feed auger 27a. The auger is driven in a manner well-known in the art by a gear-motor 22 through a gear box 23. One acceptable feeding system on which the isolation pad 30 of the present invention could be utilized is commercially available from Acrison, Inc., Moonachie, N.J. assignee of the present invention, as the Series 105 feeders with dissimilar speed, double concentric augers 27, 27a. Acceptable variable speed controllers for such a system are also commercially available from Acrison, Inc., Moonachie, N.J., assignee of the present invention, as the Series 050 variable SCR/DC controllers.

The isolation pad 30 comprises a top plate 31, a bottom plate 32 and an isolation gasket 33. The top plate 31 and bottom plate 32 are preferably made of metal, such as 304 stainless steel. The gasket 33 can be made of neoprene, natural rubber, or any other elastic material. The gasket material should be chosen such that it does not react with the material to be fed.

A supply vessel flange 13 is rigidly mounted to the supply vessel 10 near the vessel outlet 12. A feeder flange 25 is mounted to the feeding mechanism 20 at an inlet 26 to the feed trough 21. Preferably, the supply vessel 10, supply vessel flange 13, feeding mechanism 20 and feeder flange 25 are made of metal, such as 304 stainless steel.

The supply vessel flange 13 is bolted to the top plate 31 by bolts 34, 36. The feeder flange 25 is bolted to the bottom plate 32 by bolts 35, 37. No bolts connect the top plate 31 to the bottom plate 32. The top plate 31 and bottom plate 32 are connected only by the isolation gasket 33. Therefore, the supply vessel 10 is connected to the feeding mechanism 20 only by the isolation gasket 33.

Liners 50, shown in FIG. 1, made of a thin gasketing material such as neoprene or natural rubber, may be placed between the supply vessel flange 13 and the top plate 31 as well as between the feeder flange 25 and the bottom plate 32. The liners 50 prevent the flanges from rubbing against the plates and damaging the flanges or plates. The liners 50 also prevent leakage of material between the flanges and the plates.

Figure 2:
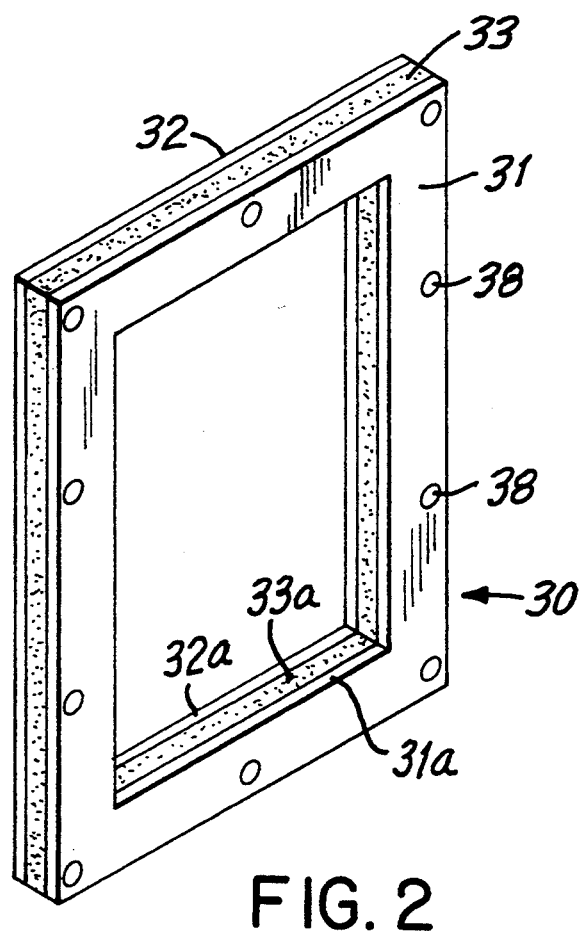
FIG. 2 is a perspective view of the isolation pad employed in the system of FIG. 1.

FIG. 2 is a perspective view of the pad 30 of the present invention shown in isolation. The isolation gasket 33 is firmly connected to the top plate 31 by an upper attaching means. The isolation gasket 33 is firmly connected to the bottom plate 32 by a lower attaching means. One acceptable attaching means is a vulcanized bond, but any other means or process which would adequately connect the plates to the gasket, would also be acceptable. The connection between the gasket 33 and the plates 31, 32 must be strong enough such that the plates do not loosen or separate from the gasket while the vessel is being vibrated. The plates 31, 32 are not connected to each other in any other way than by the gasket 33.

FIG. 3 is an exploded view of the isolation pad 30 of FIG. 2. Apertures 31a and 32a are disposed in the top plate 31 and the bottom plate 32, respectively. A gasket aperture 33a is positioned in the isolation gasket 33. Preferably, the isolation gasket 33 is annular, configured to surround the apertures 31a, 32a such that the aperture is a hole. However, the gasket could also be a permeable membrane which permits material to pass through it wherein the permeable membrane forms the aperture. While the top plate 31, bottom plate 32 and isolation gasket 33 shown have rectangular profiles, they could have a different profile (e.g. circular, square or octagonal) and still be within the scope of the invention.

As described more fully below, material flows from the aperture 31a in the top plate 31, through the gasket aperture 33a in the isolation gasket 33, and through the aperture 32a in the bottom plate 32. The isolation gasket 33 directs the flow of material from the top plate 31 to the bottom plate 32. Therefore, a material flow path is created between the supply vessel 10 and the feeding mechanism 20. Because the gasket 33 is vulcanized to the plates 31, 32, material cannot escape between the gasket and the plates.

Threaded holes 38 are disposed along the top plate 31 and the bottom plate 32, which typically accepts bolts 34, 35, 36, 37, attaching the isolation pad 30 to the supply vessel flange 13 and the feeder flange 25. The number of holes 38 is selected based on requirements of the particular size isolation pad, including the size and weight of the supply vessel, the type of material to be fed, and the amount of vibration required for proper feeding.

In operation, material to be fed is poured into the supply vessel 10 through the input 11. The material in the supply vessel 10 passes through supply vessel outlet 12 into the feed trough 21 of the feeding mechanism 20. The motor 22 is activated to drive the augers 27 and 27A of this particular type feeding mechanism, thus feeding material from the trough 21 through the feeding mechanism output conduit 24. The vibrator 40 vibrates the supply vessel 10 to insure constant flow of material from the supply vessel. The vibrator may be adjustable in either frequency or amplitude or both to optimize vibration. The speed of the motor of the feeding mechanism is controlled in a manner well-known in the art to maintain the flow of material from the feeding trough through the output conduit 24 constant. The isolation pad 30 directs the flow from the outlet 12 into the feed trough 21 as material flows from the top aperture 31a, through the gasket aperture 33a and through the bottom aperture 32a.

The isolation gasket 33, which supports the entire weight of the vessel 10 and the material in the vessel, is made of a flexible elastomeric material such as natural rubber or neoprene or any other acceptable material. Consequently, the resiliently mounted supply vessel 10 is free to vibrate without transmitting substantial vibration to the feeding mechanism 20. The supply vessel 10 is thus a "live" independent hopper.

The isolation gasket 33 is of sufficient height to permit the supply vessel to vibrate effectively but is not so high as to cause the supply vessel to become unstable. A height of ¾" for a neoprene isolation gasket has been found to be acceptable.

The weight of the supply vessel 10 and a portion of the material in the supply vessel is distributed over the surface area of the isolation gasket 33. The surface area or the durometer (i.e., the measure of hardness) of the isolation material therefore, may be increased for a heavier vessel or heavier material such that the elasticity of the material of the isolation gasket 33 is not unduly compressed under the weight of the vessel 10. The surface area and durometer of the isolation gasket 33 can be selectable so that it can support the weight of the vessel 10 when it is filled with material, yet allow the vessel 10 to vibrate effectively to insure reliable flow of product from within.

The above-described preferred embodiment of the invention is not intended to limit the scope of the invention which is defined by the following claims.

I claim:

1. An isolation pad for mounting a supply vessel to a feeding mechanism comprising:
    an upper plate having a first aperture;
    a lower plate having a second aperture;
    an isolation gasket disposed between the upper plate and the lower plate, the gasket having a gasket aperture that surrounds the first aperture and the second aperture which gasket aperture is adapted to direct material from the supply vessel to the feeding mechanism;
    an upper means for attaching the upper plate to the gasket; and
    a lower means for attaching the lower plate to the gasket.

2. The isolation pad of claim 1 wherein the gasket aperture is aligned with the first aperture and the second aperture.

3. The isolation pad of claim 1 wherein holes are disposed in the upper plate and the lower plate, the holes being adopted for engagement to the supply vessel and the feeding mechanism, respectively.

4. The isolation pad of claim 1 wherein the attaching means is a vulcanized bond.

5. A dry solid materials feeding system comprising:
    a supply vessel;
    a feeding mechanism; and
    means disposed between the vessel and the feeding mechanism for supporting the supply vessel such that it is resiliently mounted, free to vibrate with respect to the feeding mechanism, wherein the supporting means directs the flow of material from the vessel to the feeding mechanism.

6. The materials feeding system of claim 5 wherein the supporting and directing means comprises an isolation gasket disposed between the supply vessel and the feeding mechanism.

7. The materials feeding system of claim 6 further comprising a top plate fixedly attached to the gasket and disposed between the gasket and the supply vessel.

8. The materials feeding system of claim 6 further comprising a bottom plate fixedly attached to the gasket and disposed between the gasket and the feeding mechanism.

9. The materials feeding system of claim 5 wherein the supporting and directing means comprises a top plate attached to the supply vessel, a bottom plate attached to the feeding mechanism, and an isolation gasket fixedly mounted between the top plate and the bottom plate.

10. The materials feeding system of claim 9 further comprising liners disposed between the plates and the flanges.

11. The materials feeding system of claim 5 further comprising a vibrator mounted to the supply vessel.

12. The materials feeding system of claim 5 wherein the feeding system is a volumetric or gravimetric feeding system.

13. A materials feeding system comprising:
    a feeding mechanism having an inlet;
    an annular isolation pad mounted to the feeding mechanism about the inlet;
    a supply vessel having an outlet mounted on the isolation pad such that the supply vessel is free to vibrate; and
    wherein the feeding mechanism inlet and the supply vessel outlet abut the annular pad to create a material flow path from the supply vessel to the feeding mechanism.

14. The materials feeding system of claim 13 wherein the annular isolation pad comprises:
    an upper plate;
    a lower plate; and
    a gasket disposed between the upper plate and the lower plate.

15. The materials feeding system of claim 13 further comprising a means for attaching the upper plate to the gasket.

16. The materials feeding system of claim 13 further comprising a means for attaching the lower plate to the gasket.

17. The materials feeding system of claim 13 wherein the upper plate and the lower plate are vulcanized to the gasket.

18. A materials feeding system comprising:
    a supply vessel;
    a feeding mechanism; and
    an isolation pad mounted between the vessel and the feeding mechanism, which pad comprises
        a top plate;
        a bottom plate; and
        an isolation gasket disposed between the top plate and the bottom plate;
    wherein the isolation pad supports the supply vessel and directs the flow of material from the vessel to the feeding mechanism, 19. The feeding system of claim 18 further comprising a supply flange mounted to the supply vessel and feeder flange mounted to the feeding mechanism.

20. The feeding system of claim 19 wherein the supply flange is bolted to the top plate, 21. The feeding system of claim 20 wherein the feeder flange is bolted to the bottom plate.

22. The feeding system of claim 18 further comprising a vibrator mounted to the supply vessel.

23. A method of feeding material comprising:
loading a supply vessel with material to be fed;
supporting the supply vessel on a flexible gasket;
directing the flow of the material from the supply vessel to a feeding mechanism through an aperture in the flexible gasket; and
feeding material from the feeding mechanism;
wherein the supply vessel is free to vibrate with respect to the feeding mechanism.

24. The method of claim 23 wherein the step of supporting the supply vessel comprises mounting an isolation pad containing the flexible gasket to the feeding mechanism and mounting the supply vessel to the isolation pad.

25. The method of claim 24 wherein the step of mounting the isolation pad comprises bolting a bottom plate of the pad to the feeding mechanism and wherein the step of mounting the supply vessel comprises bolting a top plate of the pad to the supply vessel.

26. The method of claim 24 further comprising vibrating the supply vessel with respect to the feeding mechanism.

27. A method of making a materials feeding system comprising:
attaching an annular gasket having an aperture to an upper plate;
attaching the annular gasket to a lower plate; and
mounting the upper plate to a supply vessel and mounting the lower plate to a feeding mechanism such that a material flow path is created from the supply vessel to the feeding mechanism through the annular gasket and such that the supply vessel is supported on the annular gasket and is free to vibrate.

28. The method of claim 27 wherein the step of attaching the gasket to the upper plate comprises vulcanizing the gasket to the upper plate.

29. The method of claim 27 wherein the step of attaching the gasket to the lower plate comprises vulcanizing the gasket to the lower plate.

* * * * *

UNITED STATES PATENT AND TRADEMARK OFFICE
CERTIFICATE OF CORRECTION

PATENT NO. : 5,405,049
DATED : April 11, 1995
INVENTOR(S) : Ronald J. Ricciardi

It is certified that error appears in the above-identified patent and that said Letters Patent is hereby corrected as shown below:

Col. 5, line 56, change "adopted" to "adapted".

Signed and Sealed this

Fourth Day of July, 1995

Attest:

BRUCE LEHMAN

Attesting Officer

Commissioner of Patents and Trademarks